United States Patent Office 3,227,750
Patented Jan. 4, 1966

3,227,750
PROCESS FOR THE PRODUCTION OF
BENZENE DISULFONIC ACID
John Thomas Stephan, Longview, and Archie L. Lomax, Kelso, Wash., assignors, by mesne assignments, to Stepan Chemical Company, Northfield, Ill., a corporation of Delaware
No Drawing. Filed Oct. 22, 1962, Ser. No. 232,283
5 Claims. (Cl. 260—505)

This invention relates to the production of benzene disulfonic acid and its homologs. More particularly this invention relates to improvements in the process for sulfonating benzene or its homologs with sulfuric acid under conditions which minimize disposal-requiring-byproducts and both atmospheric and stream pollution, while providing a product high in the desired benzene disulfonic acid and low in the corresponding benzene monosulfonic acid and residual sulfuric acid.

This invention involves the use of a unique sulfonation catalyst which speeds the sulfonation reaction and increases the disulfonation while greatly minimizing the formation of undesirable side reactions producing sulfones and tars. We have discovered that benzene disulfonic acid may be separated from benzene monosulfonic acid, water, and most of the sulfuric acid by co-distillation under high vacuum. The separated benzene sulfonic acids when neutralized with alkali have advantageous utility as a disulfonation catalyst. Benzene disulfonic acid distills very little under the same conditions of temperature and pressure, which permits the simultaneous distillation of both the benzene monosulfonic acid, sulfuric acid, and water.

It has been found that when a mixture which is predominately benzene disulfonic acid with minor amounts of benzene monosulfonic acid, sulfuric acid, water, and catalyst is subjected to high vacuum distillation that the first fraction distilling off is rich in benzene monosulfonic acid and water, is relatively low in sulfuric acid, and contains substantially no benzene disulfonic acid. As batch distillation proceeds the temperature rises as the benzene monosulfonic acid and water are removed preferentially. Finally a temperature is reached where substantially nothing but 95% to 100% sulfuric acid distills over. This temperature is dependent upon the system vacuum and is about 230° C. at 5–10 mm. Hg pressure. When all the water and benzene monosulfonic acid have distilled over, approximately 95% sulfuric acid begins to distill from the solution mixture of sulfuric acid and benzene disulfonic acid at 5–10 mm. pressure absolute. Under these conditions substantially 95–100% sulfuric acid distills over at substantially constant temperature until only benzene disulfonic acid containing from 5–15% sulfuric acid remains.

It is an important part of our process that the initial distillate (which we will label A) containing the major part of the benzene monosulfonic acid be recovered separately from the later fraction (which we will label B) containing substantially only 95–100% sulfuric acid. This separation may be made industrially on the basis of the boiling point of the system under the vacuum used. We neutralize the initial distillate A with an alkali metal base such as sodium hydroxide, potassium hydroxide, lithium hydroxide, sodium carbonate, potassium carbonate, lithium carbonate, or the like, to give a crude salt of the various anions present in the A fraction. This crude salt mixture may be an acid salt, a neutral salt, or a mixture of a neutral salt plus some excess alkali. Preferably the mixture should be neutralized to a pH 7 to 8 and then evaporated to dryness for use as the catalyst in a following disulfonation process. This catalyst consists almost entirely of a mixture of alkali metal benzene monosulfonate and dialkali metal sulfate with no more than a very small quantity of alkali metal benzene disulfonate. Preferably the catalyst mixture should be dried under conditions where hydrate formation is minimized or eliminated since any water of crystallization or adsorption will only dilute the reactant sulfuric acid and slow down the disulfonation reaction. In this procedure all of the benzene monosulfonic acid and any accompanying dilute sulfuric acid and trace quantity of benzene disulfonic acid are neutralized with alkali metal base, evaporated to dryness and added as catalyst to the next sulfonation batch. By so doing any benzene monosulfonic acid is recycled as the metal salt for further reaction with sulfuric acid to the disulfonic acid and at the same time carrying sufficient alkali metal in the salt form to act as a sulfonation catalyst and a sulfone depressant. The alkali metal salts added as a catalyst and consisting of a crude mixture of alkali metal salts of benzene monosulfonic acid and sulfuric acid, remains with the benzene disulfonic acid as the alkali salt of benzene disulfonic acid (since the monosulfonic acid is further sulfonated during the reaction) when the solution mixture is vacuum distilled. The efficiency of the overall sulfonation is thereby greatly improved, the only loss of benzene being in the small amount of sulfone and tars formed since the catalyst effectively retards or eliminates their formation. By the application of our invention to the production of benzene disulfonic acid it is possible to achieve practically quantitative conversion of both benzene and sulfuric acid. Since 100% sulfuric acid is considerably cheaper than oleum (e.g. $H_2SO_4$ with 30% $SO_3$) or anhydrous sulfur trioxide, it is seen that our invention is an extremely low cost disulfonation process. While we have been primarily concerned with the disulfonation of benzene, the process of the invention is also applicable to the disulfonation of toluene as will be readily seen by anyone skilled in the art.

The sulfonation of benzene has been extensively studied in the past and a number of interesting improvements are noted in the patent literature. Cotton in U.S. Patent No. 951,925 employs 26% oleum in the presence of a catalyst preferably consisting of sodium sulfate and ammonium metavanadate at a vacuum of 15″ to 20″ Hg (see page 2, lines 78–90 of said patent). This catalyst is particularly unsuitable where neutralization of the product with sodium hydroxide or its equivalent is required with separation of byproduct sodium sulfate. Sodium sulfate contaminated with vanadium ion is virtually unsalable due to the color problem. By this we mean not so much the color of the salt itself, but if for example a vanadium contaminated saltcake is used in the kraft pulping process, the resulting paper is off color due to the adsorption of the contaminating ions. The removal of the vanadium ions from the crude saltcake is a tedious and expensive procedure involving ion-exchange resin and the disposal of large quantities of dilute vanadium containing residues.

Our process differs from that disclosed by the Cotton patent in that we do not employ any Group V or VI metal salt catalyst or oleum and we separate the product benzene disulfonic acid from the unreacted monosulfonic acid and sulfuric acid by a distillation process at elevated temperature under high vacuum whereby the distilland is separated into two separate fractions containing respectively substantially 95–100% sulfuric acid in one fraction and the other containing benzene monosulfonic acid, water, a minor amount of sulfuric acid, and a trace of benzene disulfonic acid. The fraction containing the water is neutralized with an alkaline substance, and evaporated to dryness to serve as the catalyst for a subsequent sulfonation batch. The 95–100% sulfuric acid recovered is likewise usable in following batches or returned to storage. In this manner we are able to prepare a benzene disulfonic acid which is of high purity. For example, the disodium salt of benzene disulfonic acid produced by our process is of such purity that it can be used for the production of resorcinol by the caustic soda fusion process without further purification. The use of such a product has important advantages since the low-to-none sulfuric acid content enables the sodium salt to be charged directly to the sodium hydroxide fusion mass, and since there is no or little disodium sulfate to complicate matters by raising the required fusion temperature due to the higher melting point of the disodium sulfate. In earlier processes it has been necessary to remove the excess sulfuric acid by reacting the original sulfonated product with lime, whereby insoluble calcium sulfate is precipitated and removed. The calcium salt of the benzene disulfonic acid is then reacted with soda ash whereby calcium carbonate is precipitated, filtered off, thus regenerating the sodium disulfonate for use in the fusion process. This is obviously an expensive and cumbersome method of making the sodium salt for use in the fusion process and involves manipulation of copious quantities of reagent lime and byproduct calcium sulfate. Separating the precipitated calcium sulfate from the regenerated sodium sulfonate necessitates a filtration step. The precipitate must be washed to recover the occluded sodium salt of the benzene disulfonic acid and the net result is that the sodium benzene sulfonate is recovered as a dilute solution which has to be concentrated in order to be used in the classic caustic soda fusion process. By virtue of our invention this tedious procedure is eliminated since our benzene disulfonic acid product can be neutralized directly with alkali metal base and the resulting product added directly to fused sodium hydroxide without fear of elevating the melting point of the fusion mass and causing trouble in the fusion process. For example; during the fusion of di-sodium benzene disulfonate with sodium hydroxide, two moles of di-sodium sulfite are produced for every mole of di-sodium resorcinate produced. The melting point of sodium hydroxide is 318° C. whereas the melting point of sodium sulfate is 884° C. The addition of sodium sulfate to the sodium hydroxide- sodium sulfide- disodium resorcinate- disodium benzene disulfonate system raises the melting point of the system. The higher melting point is to be avoided because of the expensive extra heat load and the extra corrosion and materials of construction problems which have to be solved.

Downs in U.S. Patent No. 1,301,785 separates sulfuric acid from benzene disulfonic acid by distillation under vacuum at ½″ to 1″ Hg (note page 2, lines 9–17 and lines 69 to 97 of said patent). Our process is an improvement over Downs in that we co-distill substantially all of the benzene monosulfonic acid with sulfuric acid at higher vacuum to produce (1) a weak sulfuric acid-benzene monosulfuric acid solution in water which is neutralized with alkali and evaporated to dryness and returned to the next sulfonation batch as catalyst; (2) a 95–100% sulfuric acid distillate which removes practically all of the excess acid and eliminates the need for excess alkali in neutralization; and (3) a practically pure benzene disulfonic acid product substantially free of benzene monosulfonic acid and suitable for direct fusion as the di-sodium salt. This process has the advantage over Downs that the sulfuric acid can be removed substantially entirely. Any monosulfonic acid is distilled, condensed, neutralized and returned to the next batch for further disulfonation. The yield of benzene disulfonic acid based on the benzene is practically quantitative, and since a minimum of sulfuric acid is lost as disodium sulfate, the overall yield of benzene disulfonic acid based on the sulfuric acid is also at a maximum. The use of the crude sodium salt of the monosulfonic acid as a catalyst in our process is essential to increase the speed of the disulfonation and at the same time recover the benzene monosulfonic acid.

The sodium benzenemonosulfonate and sodium sulfate mixture may be added before or after the monosulfonation stage. The use of the mixture of disodium sulfate and sodium benzene monosulfonate as catalyst greatly minimizes sulfone and tar formation, in fact practically eliminates them. This is a surprising discovery in that the addition of sodium benzene monosulfonate to sulfuric acid does not accelerate sulfone formation while permitting further sulfonation to the benzene disulfonic acid form. While a rigorously proved explanation of this phenomenon is not available at the present time, we believe it is likely that the salt form of the benzene monosulfonate forms a catalytic complex with the sulfuric acid which results in disulfonation of the benzene ring rather than sulfone formation between the benzene monosulfonate and benzene or sulfone formation between two molecules of benzene monosulfonate. The catalytic complex is formed and propagated much in the fashion of a chain reaction.

The following examples will serve to more fully describe our invention but are not to be construed as limiting the scope of the invention because satisfactory product benzene disulfonic acid has been prepared by our procedure over the entire range of conditions described in the specification.

EXAMPLE I 10 lbs. of catalyst analyzing 17.9% sodium sulfate and 77.7% sodium benzene monosulfonate was charged to a 100 gal. Pfaudler glass lined kettle and 225 lbs. of benzene (nitration grade, obtained from Van Waters & Rogers Co.) was charged at 60° F. The kettle was equipped with a turbine agitator revolving at 78 r.p.m. Immediately following 622 lbs. of 99% sulfuric acid (obtained from the General Chemical Co.) was charged. The kettle was heated by circulating liquid heat transfer medium, such as Arochlor 1248 marketed by Monsanto Chemical Company, through the jacket being careful to maintain temperature control so as not to exceed the temperature differential recommended by the manufacturer of the kettle. The kettle was equipped with 20 feet of 4″ diameter glass-air condenser and a 15 sq. ft. glass-water condenser in series. The condenser cooling water was circulated from a 50 gal. reservoir and the temperature of the water was allowed to rise gradually as the run progressed so as to minimize thermal shock on the glass-water condenser. No heat was removed from the condenser water except by natural radiation or convection from the 50 gal. drum containing the water.

The temperature of the reaction mass in the liquid phase varied as shown in Table 1. Such refluxing as occurred took place in the vertical rising section of the air condenser before the water condenser. Obviously since there was substantially no refluxing when the temperature of the reaction mass reached the boiling point of benzene, it is evident that the reaction had proceeded at least to the benzene monosulfonic acid stage by that time.

*Table 1*

| | Internal Temperature, ° C. | Vapor Temperature, ° C. | Condenser Water Temperature, ° C. |
|---|---|---|---|
| Start | 15 | 15 | |
| ½ hr | 48 | 16 | |
| 1 hr | 85 | 16 | 15 |
| 1½ hr | 108 | 18 | |
| 2 hr | 118 | 87 | 16 |
| 2½ hr | 143 | 51 | 17 |
| 3 hr | 159 | 41 | 18 |
| 3¼ hr | 167 | 60 | 21 |

After the reaction has proceeded for 3¼ hours and the temperature of the reaction mass was 167° C. a vacuum of 23 mm. Hg absolute was applied and the heating continued as shown in Table 2. Nitrogen gas at the rate of 8.5 liters per minute was admitted below the stirrer as a gas sweep. The gas was measured at 60° F. and 760 mm. pressure. The nitrogen provided an inert sweep which helped to remove the acidic material distilling under vacuum.

Table 2

| Time, hr. | Temperature | | | | Vacuum, In mm. Hg | Distillation rate, In cc./min. |
|---|---|---|---|---|---|---|
| | Liquid phase, °C. | Vapor before air-condenser, °C. | Vapor before water condenser, °C. | Condenser water, °F. | | |
| 0 | 167 | 60 | 21 | 62 | 23 | |
| ¾ | 180 | 110 | 44 | 70 | 24 | 68 |
| 1¼ | 192 | 127 | 54 | 82 | 25 | 68 |
| 2¾ | 202 | 142 | 62 | 86 | 27 | 63 |
| 3¼ | 217 | 165 | 73 | 90 | 28 | 57 |
| 3¾ | 230 | 187 | 85 | 91 | 28 | 60 |
| 4¼ | 245 | 210 | 105 | 91 | 28.5 | 60 |
| 4¾ | 250 | 220 | 102 | 93 | 28.5 | 100 |
| 5¼ | 252 | 225 | 132 | 95 | 29.5 | 105 |
| 5¾ | 257 | 224 | 131 | 96 | 30.0 | 97 |
| 6¼ | 259 | 224 | 130 | 97 | 29.5 | 93 |
| 6¾ | 261 | 224 | 125 | 97 | 29.5 | 86 |
| 7¼ | 265 | 225 | 118 | 96 | 29.0 | 73 |
| 7¾ | 270 | 228 | 114 | 97 | 28.5 | 67 |
| 8¼ | 269 | 231 | 111 | 96 | 31.0 | 60 |
| 8¾ | 269 | 223 | 73 | | | |

In addition to the recovered distilland of 97 lbs., approximately 60 lbs. of acid vapor of the same chemical composition was absorbed in alkali in a fume scrubber.

The 97 lbs. recovered acid analyzed 20.1% benzene monosulfonic acid, 30.5% sulfuric acid, 49.4% water. No appreciable quantity of benzene disulfonic acid was present. The recovered acid was neutralized with 58.3 lbs. of 50% NaOH solution and evaporated to dryness to give approximately 65 lbs. of catalyst for the next cycle.

The product left in the reaction kettle was 700 lbs. and analyzed 84.8% benzene disulfonic acid, 14.1% sulfuric acid, 0.6% tar and sulfones, 0.5% ash (as $Na_2SO_4$). No appreciable benzene monosulfonic acid was found by analysis. A portion of the product benzene disulfonic acid was subsequently neutralized with sodium carbonate to give a mixture of disodium benzene disulfonate and disodium sulfate, which was then fused with excess NaOH to give disodium resorcinate.

Another 10 lb. portion of the product benzene disulfonic acid was neutralized with 15 lbs. tri-ethanolamine to a pH of 7.0 and added at the 0.2% level to a chromium plating bath to increase the throwing power of the bath.

EXAMPLE II 156.2 grams of benzene and 600.0 grams of 96.1% sulfuric acid were charged into a 750 cc. flask equipped with stirrer and reflux condenser. The temperature at the start was 19° C. and in one hour had risen to 107° C. by application of gentle heating. The temperature was maintained at this temperature for 6 hours at which time the condenser was changed to allow for vacuum distillation from the flask and 36.2 grams of dry powder catalyst analyzing 43.0% sodium benzene monosulfonate and 53.4% disodium sulfate was added. Heat and vacuum were applied and in 1 hour the temperature of the liquid mass in the flask rose to 194° C. under 10 mm. Hg vacuum. The variation of temperature and vacuum are shown in the following table.

| Time | Temperature, °C. | Pressure, mm. |
|---|---|---|
| Start | 107 | 760 |
| 1 hr | 194 | 10 |
| 2 hr | 238 | 15 |
| 3 hr | 230 | 19 |
| 4 hr | 230 | 20 |
| 5 hr | 230 | 25 |
| 6 hr | 242 | 30 |
| 7 hr | 248 | 30 |

The distillate obtained from the beginning to 4 hours is labeled Distillate A and amounted to 108.3 grams and analyzed 14.2 grams of benzene monosulfonic acid, 13.9 grams sulfuric acid (100%), 1.4 grams of char and sulfones, and 78.8 grams of water.

The distillate obtained between 4 and 7 hours of distillation is labeled Distillate B and amounted to 108.9 grams analyzing 0.63 gram benzene monosulfonic acid, 106.2 grams sulfuric acid, 0.76 gram char and sulfones, and approximately 1.32 grams water.

The product in the flask consisted of 518.9 grams and analyzed 354.0 grams benzene disulfonic acid, 71.6 grams benzene monosulfonic acid, 77.3 grams sulfuric acid, 8.2 grams char and sulfones, 3.8 grams ash and approximately 4.0 grams of water.

The Distillate A was neutralized with 29.9 grams of 50% sodium hydroxide solution and evaporated to dryness to give approximately 36.2 grams of mixed sodium salts of sulfuric acid and benzene monosulfonic acid. The composition of this dried salt was substantially identical with the composition of the 36.2 grams of catalyst employed in the sulfonation and was set aside for use as catalyst in subsequent examples.

This example shows how the distilled acid is separated into a weak acid and a strong acid. The weak acid is neutralized with caustic soda and subsequently used as a catalyst. The strong acid is re-usable as sulfonating acid thus effecting a maximum recovery and economy in the operation. By lowering the ratio of sulfuric acid to benzene in the processing less distillation is required to separate the benzene disulfonic acid from the others and a smaller amount of 95–100% sulfuric acid is collected as the "B" fraction. Obviously it is most advantageous to operate so that the "B" fraction is a minimum.

With commercial equipment it is feasible to operate at a molar ratio of sulfuric acid to benzene of approximately 2.18 and still produce a product analyzing at least about 75% benzene disulfonic acid. Ratios up to 3.12 have been used with equivalent results.

What is claimed is:

1. In the benzene disulfonic acid producing reaction wherein benzene is reacted with excess sulfuric acid in the presence of alkali metal sulphate and alkali metal benzene sulphonate, which involves distillation of the reaction products evolved from a mixture of benzene disulfonic acid, benzene monosulfonic acid, excess sulfuric acid, and water, the process comprising: distilling the mixture at a pressure below about 30 mm. Hg and in the presence of a catalyst consisting essentially of a mixture of alkali metal sulfate and alkali metal benzene monosulfonate until the distillate contains substantially all of said benzene monosulfonic acid and said water, together with a minor amount of said sulfuric acid; separating such distillate prior to further distillation; neutralizing the separated distillate with an alkali metal base; and removing at least most of the water from the neutralized distillate to place such in a form suitable for use as the catalyst in a subsequent benzene disulfonic acid producing reaction.

2. The process of claim 1, comprising distilling off the benzene monosulfonic acid containing distillate in the presence of an inert gas sweep.

3. The process of claim 2, wherein said gas sweep is nitrogen gas.

4. The batch process for the manufacture of benzene disulfonic acid substantially free of benzene monosulfonic acid and containing less than about 15% sulfuric acid, said process comprising: reacting benzene with an excess of sulfuric acid at a temperature below about 78° C. and in the presence of a catalyst consisting essentially of a mixture of alkali metal sulfate and alkali metal benzene monosulfonate until substantially all of the benzene is reacted at least to the benzene monosulfonic acid stage; continuing the reaction at a vacuum of less than about 30 mm. Hg absolute and a temperature of about 150° C.–270° C. while distilling off as a first distillate portion a mixture of dilute sulfuric acid and benzene monosulfonic acid; recovering said first distillate portion separately by condensation until approximately 95%–100% sulfuric acid begins to distill off at this distillation pressure; recovering a second distillate portion as a separate concentrated acid comprising at least about 95% sulfuric acid and about 3% benzene monosulfonic acid; continuing the distillation until substantially no benzene monosulfonic acid and less than about 15% by weight of sulfuric acid is left in the product undergoing distillation; neutralizing the separately recovered first distillate portion with an alkali metal base; evaporating the thus neutralized distillate portion to dryness; and catalyzing a subsequent benzene disulfonic acid producing reaction with the resulting substantially anhydrous mixture of alkali metal benzene monosulfonate and alkali metal sulfate.

5. The process according to claim 4, comprising supplying part of the sulfuric acid for the subsequent benzene disulfonic acid producing reaction by introduction thereto of the said second distillate portion recovered from a preceding such reaction.

References Cited by the Examiner

UNITED STATES PATENTS

| | | | |
|---|---|---|---|
| 1,279,295 | 9/1918 | Downs | 260—505 |
| 1,279,296 | 9/1918 | Downs | 260—505 |
| 1,301,360 | 4/1919 | Bender | 260—505 |
| 1,301,785 | 4/1919 | Downs | 260—505 |
| 1,915,925 | 6/1933 | Cotton | 260—505 |

FOREIGN PATENTS 679,827    9/1952    Great Britain.

LORRAINE A. WEINBERGER, *Primary Examiner.*

LEON ZITVER, *Examiner.*

B. M. EISEN, A. P. HALLUIN, *Assistant Examiners.*